(12) United States Patent (10) Patent No.: US 12,654,735 B2

Naserian et al. (45) Date of Patent: Jun. 16, 2026

(54) HIDDEN ROAD PARAMETER DETECTION SYSTEM

(71) Applicant: GM Global Technology Operations LLC, Detroit, MI (US)

(72) Inventors: Mohammad Naserian, Windsor (CA); Allan Kenneth Lewis, Windsor (CA); Apral Singh Hara, LaSalle (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 440 days.

(21) Appl. No.: 18/310,571

(22) Filed: May 2, 2023

(65) Prior Publication Data

US 2024/0367675 A1 Nov. 7, 2024

(51) Int. Cl.
B60W 60/00 (2020.01)
B60W 50/14 (2020.01)
G06V 20/58 (2022.01)

(52) U.S. Cl.
CPC .......... B60W 60/001 (2020.02); B60W 50/14 (2013.01); G06V 20/582 (2022.01); G06V 20/584 (2022.01); B60W 2420/403 (2013.01); B60W 2420/408 (2024.01); B60W 2554/4041 (2020.02); B60W 2556/45 (2020.02)

(58) Field of Classification Search
CPC ............... B60W 60/001; B60W 50/14; B60W 2420/403; B60W 2420/408; B60W 2554/4041; B60W 2556/45; B60W 30/0956; B60W 60/00; G06V 20/582; G06V 20/584; G08G 1/0104; G08G 1/0125; G08G 1/096725

See application file for complete search history.

(56) References Cited

U.S. PATENT DOCUMENTS

| | | | | |
|---|---|---|---|---|
| 2017/0301237 A1* | 10/2017 | MacNeille | .......... | H04W 68/005 |
| 2019/0250626 A1* | 8/2019 | Ghafarianzadeh | ... | G08G 1/0112 |
| 2021/0035451 A1* | 2/2021 | Bang | ..................... | B60Q 1/525 |
| 2021/0347381 A1* | 11/2021 | Zhu | ..................... | B60W 10/04 |

* cited by examiner

*Primary Examiner* — Jelani A Smith
(74) *Attorney, Agent, or Firm* — Vivacqua Crane, PLLC

(57) ABSTRACT

A hidden road parameter detection system is provided with a host vehicle. The system includes a remote vehicle having one or more remote input devices generating one or more remote input signals associated with data indicative of a host vehicle, the road parameter, and/or an obstruction blocking a line of sight between the host vehicle and the road parameter. The system further includes a computer having one or more processors and a non-transitory computer readable medium storing instructions, such that the processor is programmed to compare a classification of the obstruction. The processor is further programmed to generate an actuation signal in response to the processor determining that the obstruction is blocking the line of sight from the host vehicle to the road parameter. The host vehicle includes one or more notification devices notifying an occupant of the host vehicle of the road parameter.

19 Claims, 5 Drawing Sheets

HIDDEN ROAD PARAMETER DETECTION SYSTEM

INTRODUCTION

The present disclosure relates to systems for warning vehicles about road conditions, and more particularly to a hidden road parameter detection system where a host vehicle communicates with a local remote vehicle to identify a road parameter, which is within a field of view of the local remote vehicle and spaced from a field of view of the host vehicle.

Automotive manufacturers are continuously investigating vehicle systems for detecting road parameters. These systems may include a monitoring device with a sensor (e.g., an ultrasonic, infrared sensor, etc.) in the vehicle's exterior mirror for monitoring a blind spot region. The system further includes a control unit that is connected to the sensor and receives an input signal from the sensor. The control unit causes a visual signal to light up in an exterior mirror when an object is detected in a blind spot of the occupant in order to warn an occupant. While these systems notify occupants of road parameters within a field of view of sensors mounted to the vehicle and spaced from a field of view of the occupant, the system may not notify occupants of road parameters that are spaced from the field of view of the sensors mounted to the vehicle with the occupant.

Thus, while the current vehicle warning systems achieve their intended purpose, there is a need for an improved vehicle warning systems that addresses these issues.

SUMMARY

According to several aspects, a hidden road parameter detection system with a host vehicle is provided. The system includes one or more local remote vehicles having one or more remote input devices generating one or more remote input signals associated with data indicative of the host vehicle, the road parameter, and/or an obstruction blocking a line of sight between the host vehicle and the road parameter. The system further includes a computer having one or more processors communicating with the host vehicle. The computer further includes a non-transitory computer readable medium storing instructions, such that the processor is programmed to receive the remote input signal from the remote input device. The processor is further programmed to compare a classification of the obstruction to a plurality of predetermined size classifications, in response to the processor receiving the remote input signal from the remote input device. The processor is further programmed to determine a field of view of the host vehicle based on a position of the host vehicle, a position of the road parameter, and a position of the obstruction, in response to the processor receiving the remote input signal. The processor is further programmed to compare the field of view to a line of sight from the host vehicle to the road parameter. The processor is further programmed to generate an actuation signal, in response to the processor determining that the obstruction is blocking the line of sight from the host vehicle to the road parameter. The processor is further programmed to transmit the actuation signal to the host vehicle. The host vehicle includes one or more notification devices notifying an occupant of the host vehicle of the road parameter, in response to the notification device receiving the actuation signal from the processor.

In one aspect, the obstruction includes one of the local remote vehicle positioned between the host vehicle and the road parameter and a third vehicle separate from the host vehicle and the local remote vehicle.

In another aspect, the processor is further programmed to determine that the traffic signal is projecting a green light, in response to the processor receiving the remote input signal from the remote input device.

In another aspect, the processor is further programmed to generate the remote input signal further associated with data indicative of the obstruction being stopped before the green light, and the processor is further programmed to generate the actuation signal associated with an instruction for the host vehicle to actuate an autonomous driving module of the host vehicle to maneuver the host vehicle around the obstruction.

In another aspect, the processor is further programmed to determine that the traffic signal is projecting a red light, in response to the processor receiving the remote input signal from the remote input device.

In another aspect, the processor is further programmed to generate the remote input signal further associated with data indicative of one of the obstruction travelling through the red light, and the processor is further programmed to generate the actuation signal associated with an instruction for the host vehicle to actuate the autonomous driving module to stop the host vehicle before the red light.

In another aspect, the processor is further programmed to determine a notification associated with the roadside sign, in response to the processor receiving the remote input signal from the remote input device.

In another aspect, the processor is further programmed to generate the actuation signal associated with an instruction for the host vehicle to actuate the autonomous driving module to control the host vehicle based on the notification.

In another aspect, the notification indicates a speed limit, and the host vehicle includes one or more host input devices generating one or more host input signals associated with data indicative of a real-time speed of the host vehicle. The actuation signal is associated with an instruction for the host vehicle to actuate the autonomous driving module to decrease the real-time speed of the host vehicle to the speed limit.

In another aspect, the remote input device includes a camera, a wheel speed sensor, a Radio Detection and Ranging device, a Light Detection and Ranging device, and/or a Global Positioning System, and an Inertial Measurement Unit.

According to several aspects, a computer is provided for a hidden road parameter detection system with a host vehicle and a remote vehicle. The computer includes one or more processors communicating with the host vehicle. The computer further includes a non-transitory computer readable medium storing instructions, such that the processor is programmed to receive one or more remote input signals from one or more remote input devices of the local remote vehicle. The remote input signal is associated with data indicative of the host vehicle, the road parameter, and/or an obstruction blocking a line of sight between the host vehicle and the road parameter. The processor is further programmed to compare a classification of the obstruction to a plurality of predetermined size classifications, in response to the processor receiving the remote input signal from the remote input device. The processor is further programmed to determine a field of view of the host vehicle based on a position of the host vehicle, a position of the road parameter, and a position of the obstruction, in response to the processor receiving the remote input signal. The processor is further programmed to compare the field of view to a line of sight from the host vehicle to the road parameter. The processor is further programmed to generate an actuation signal, in response to the processor determining that the obstruction is blocking the line of sight from the host vehicle to the road parameter. The processor is further programmed to transmit the actuation signal to the host vehicle. The host vehicle includes one or more notification devices notifying an occupant of the host vehicle of the road parameter, in response to the notification device receiving the actuation signal from the processor.

In one aspect, the road parameter is a traffic signal projecting a green light associated with the host vehicle. The processor is further programmed to determine that the traffic signal is projecting the green light, in response to the processor receiving the remote input signal from the remote input device. The processor is further programmed to generate the remote input signal associated with data further indicative of the obstruction being stopped before the green light. The processor is further programmed to generate the actuation signal further associated with an instruction for the host vehicle to actuate an autonomous driving module of the host vehicle to maneuver the host vehicle around the obstruction. The processor is further programmed to actuate an autonomous driving module of the host vehicle to maneuver the host vehicle around the obstruction, in response to the autonomous driving module receiving the actuation signal from the processor.

In another aspect, the road parameter is the traffic signal projecting a red light associated with the host vehicle. The processor is further programmed to determine that the traffic signal is projecting the red light, in response to the processor receiving the remote input signal from the remote input device. The processor is further programmed to generate the remote input signal associated with data further indicative of one of the obstruction travelling through the red light. The processor is further programmed to generate the actuation signal further associated with an instruction for the host vehicle to actuate the autonomous driving module to stop the host vehicle before the red light. The processor is further programmed to actuate the autonomous driving module to cause the host vehicle to stop before the red light, in response to the autonomous driving module receiving the actuation signal from the processor.

In another aspect, the road parameter is a roadside sign positioned adjacent to a road where the host vehicle is located. The processor is further programmed to determine a notification associated with the roadside sign, in response to the processor receiving the remote input signal from the remote input device. The processor is further programmed to actuate the autonomous driving module to operate the host vehicle based on the notification, in response to the host vehicle receiving the actuation signal.

In another aspect, the notification indicates a speed limit, and the processor is further programmed to generate the remote input signal associated with data further indicative of a real-time speed of the host vehicle. The processor is further programmed to generate the actuation signal further associated with an instruction for the host vehicle to actuate the autonomous driving module to decrease the real-time speed to the speed limit. The autonomous driving module decreases the real-time speed of the host vehicle to the speed limit, in response to the host vehicle receiving the actuation signal from the processor.

According to several aspects, a method is provided for operating a computer of a hidden road parameter detection system. The method includes generating, using one or more remote input devices of a remote vehicle, one or more remote input signals associated with data indicative of a host vehicle, a road parameter, and/or an obstruction blocking a line of sight between the host vehicle and the road parameter. The method further includes receiving, using one or more processors of a computer of the local remote vehicle, the remote input signal from the remote input device, with the computer further including a non-transitory computer readable medium storing instructions. The method further includes comparing, using the processor, a classification of the obstruction to a plurality of predetermined size classifications in response to the processor receiving the remote input signal from the remote input device. The method further includes determining, using the processor, a field of view of the host vehicle based on a position of the host vehicle, a position of the road parameter, and a position of the obstruction in response to the processor receiving the remote input signal. The method further includes comparing, using the processor, the field of view to a line of sight from the host vehicle to the road parameter. The method further includes generating, using the processor, an actuation signal in response to the processor determining that the obstruction is blocking the line of sight from the host vehicle to the road parameter. The method further includes transmitting, using the processor, the actuation signal to the host vehicle. The host vehicle includes one or more notification devices notifying an occupant of the host vehicle of the road parameter in response to the notification device receiving the actuation signal from the processor.

In one aspect, the method further includes further includes determining, using the processor, that the traffic signal is projecting a green light, in response to the processor receiving the remote input signal associated with data indicative of the green light. The method further includes generating, using one or more remote input devices of the local remote vehicle, one or more remote input signals associated with data indicative of the obstruction being stopped before the green light. The method further includes generating, using the processor, the actuation signal in response to the processor further receiving the host input signal. An autonomous driving module of the host vehicle maneuvers the host vehicle around the stopped obstruction.

In another aspect, the method further includes determining, using the processor, that the traffic signal is projecting a red light in response to the processor receiving the remote input signal from the remote input device. The method further includes generating, using the host input device, the host input signal associated with data indicative of the obstruction travelling through the red light. The method further includes generating, using the processor, the actuation signal in response to the processor further receiving the host input signal. An autonomous driving module of the host vehicle stops the host vehicle before the red light.

In another aspect, the method further includes determining, using the processor, a notification associated with a roadside sign in response to the processor receiving the remote input signal from the remote input device. The method further includes generating, using the host input device, the host input signal associated with data indicative of a host vehicle parameter associated with the host vehicle. The method further includes generating, using the processor, the actuation signal in response to the processor further receiving the host input signal. An autonomous driving module of the host vehicle controls the host vehicle based on the notification.

In another aspect, the method further includes determining, using the processor, a speed limit associated with the notification of the roadside sign. The method further includes generating, using one or more host input devices, one or more host input signals associated with data indicative of a real-time speed of the host vehicle. The method further includes decreasing, using the autonomous driving module of the host vehicle, the real-time speed of the host vehicle based on the speed limit.

Further areas of applicability will become apparent from the description provided herein. It should be understood that the description and specific examples are intended for purposes of illustration only and are not intended to limit the scope of the present disclosure.

DETAILED DESCRIPTION

The following description is merely exemplary in nature and is not intended to limit the present disclosure, application, or uses.

Figure 1:
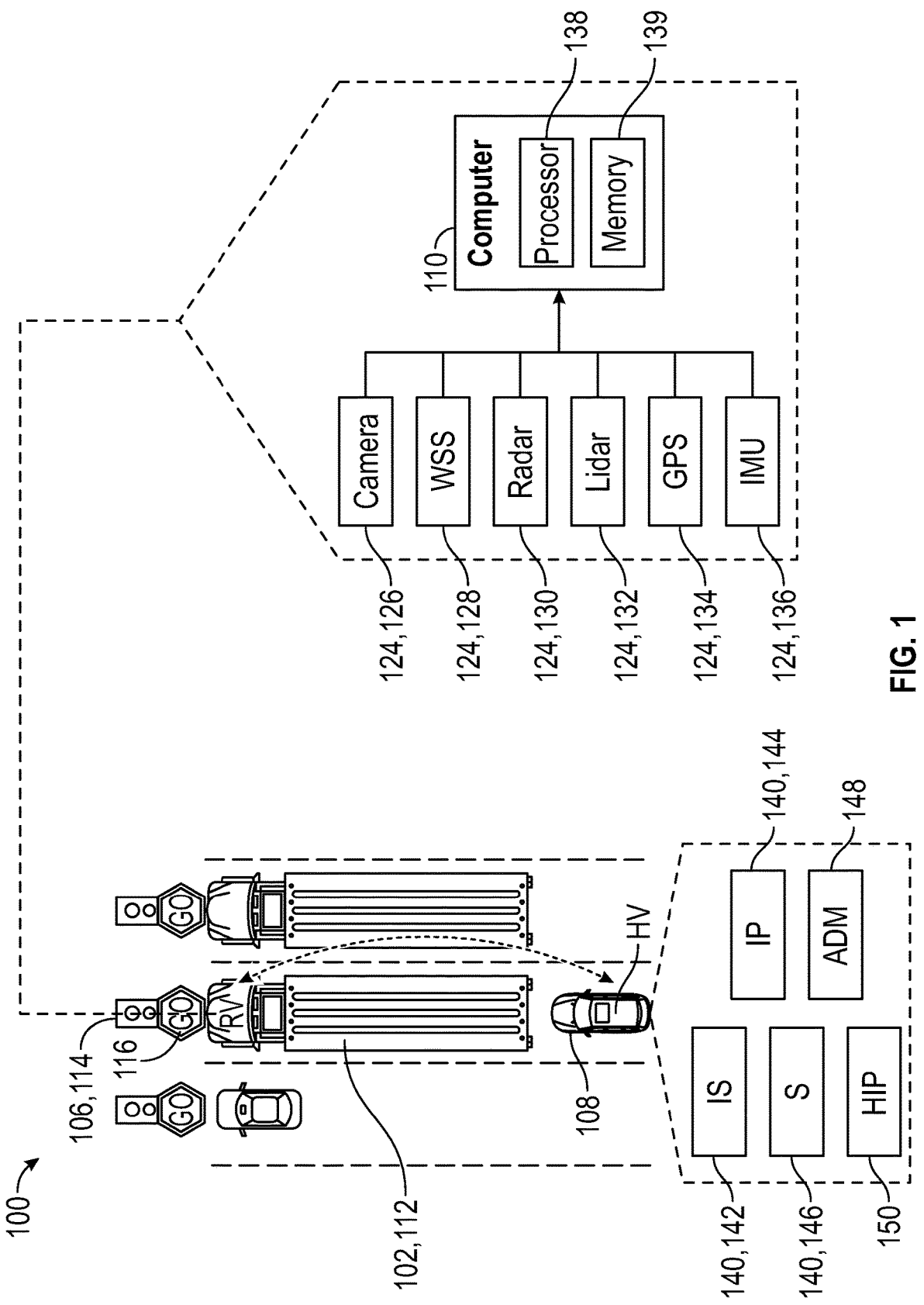
FIG. 1 is a schematic view of one non-limiting example of a hidden road parameter detection system including a host vehicle, where an obstruction blocks a line of sight from the host vehicle to a traffic signal and the local remote vehicle communicates with the host vehicle to indicate that the traffic signal is projecting a green light.
Figure 2:
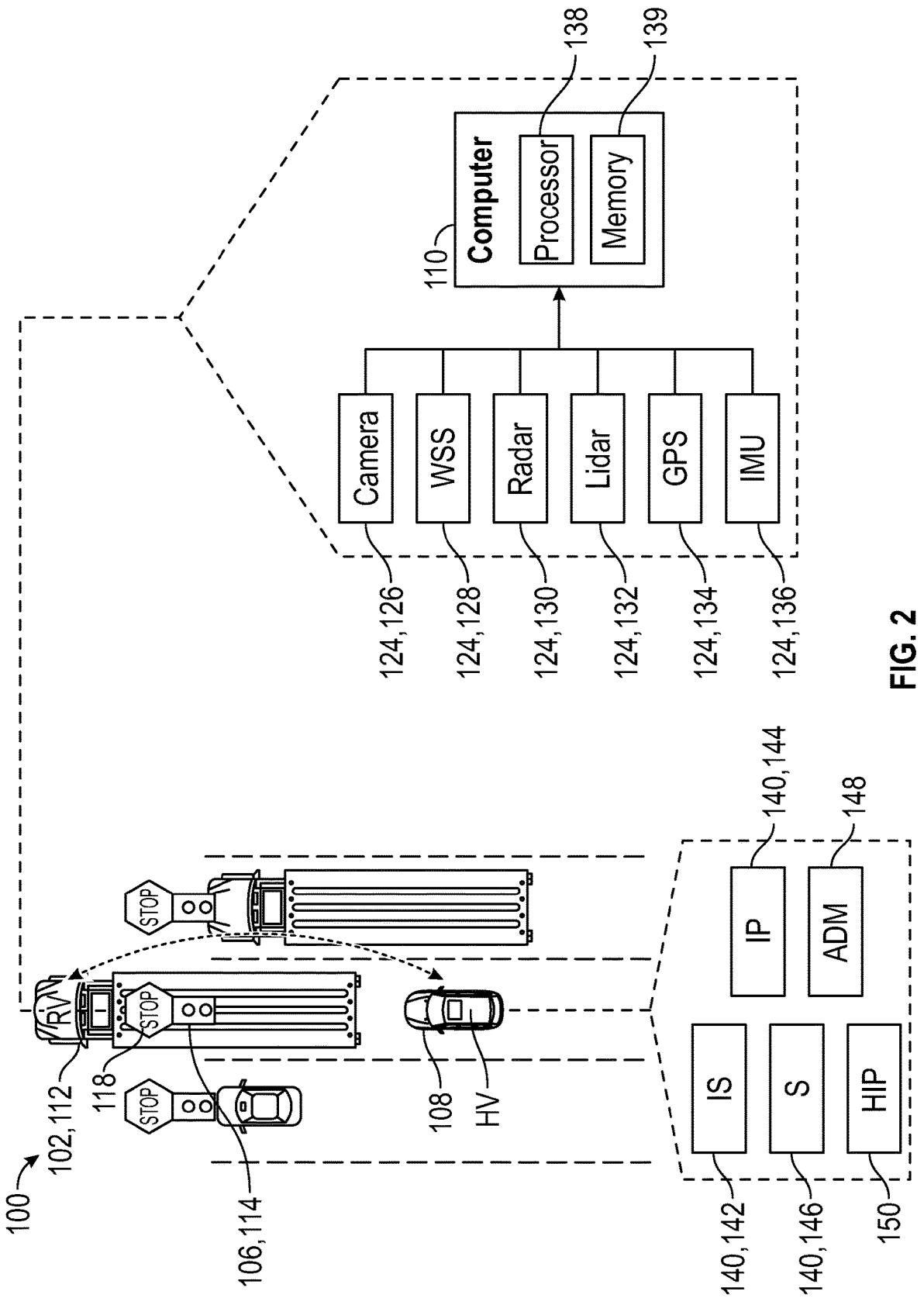
FIG. 2 is a schematic view of the hidden road parameter detection system of FIG. 1, illustrating the local remote vehicle communicating with the host vehicle to indicate that the traffic signal is projecting a red light.
Figure 3:
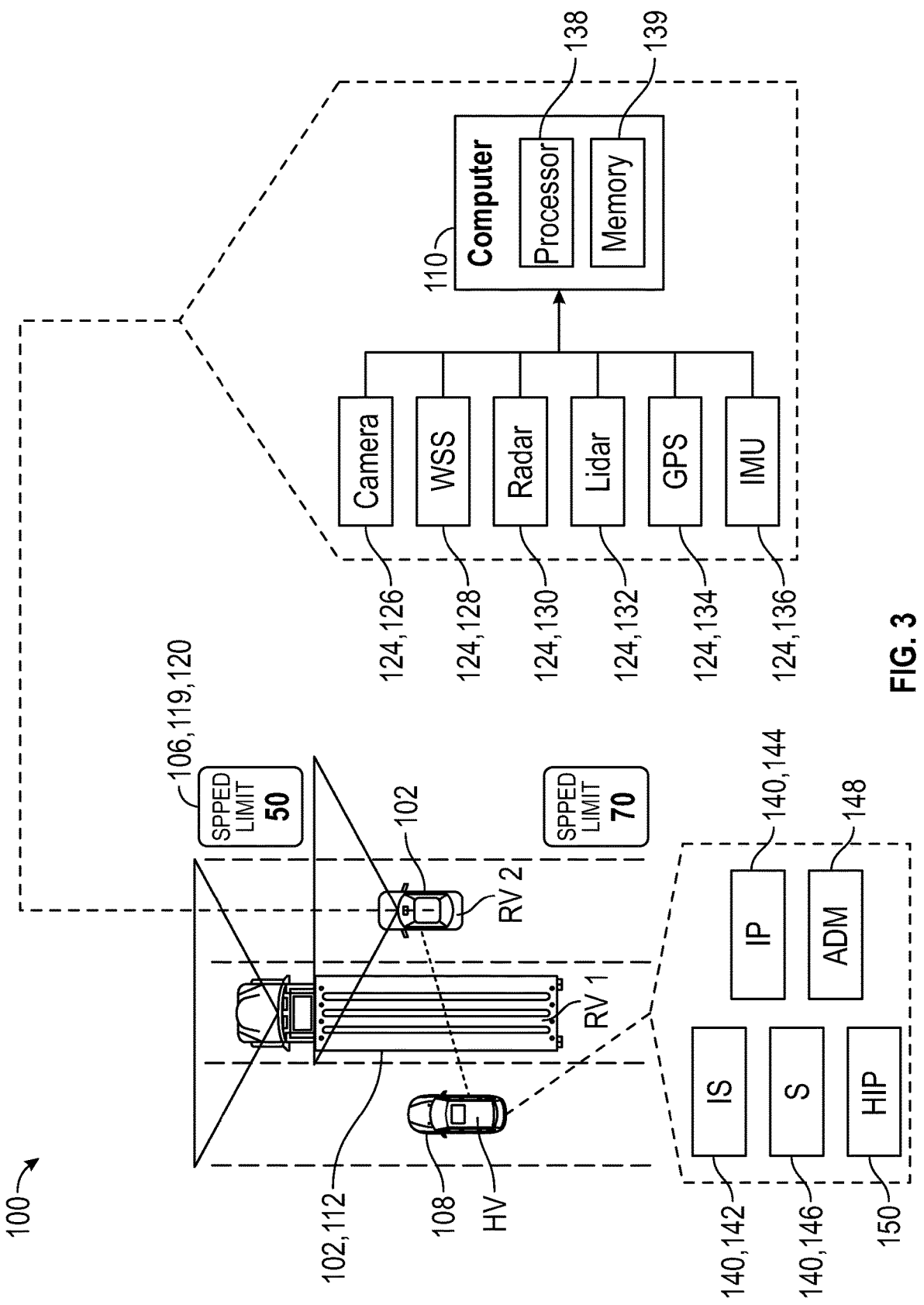
FIG. 3 is a schematic view of the hidden road parameter detection system of FIG. 1, where the local remote vehicle blocks a line of sight from the host vehicle to a roadside sign and the local remote vehicle communicates with the host vehicle to indicate a notification displayed by the roadside sign.
Figure 4:
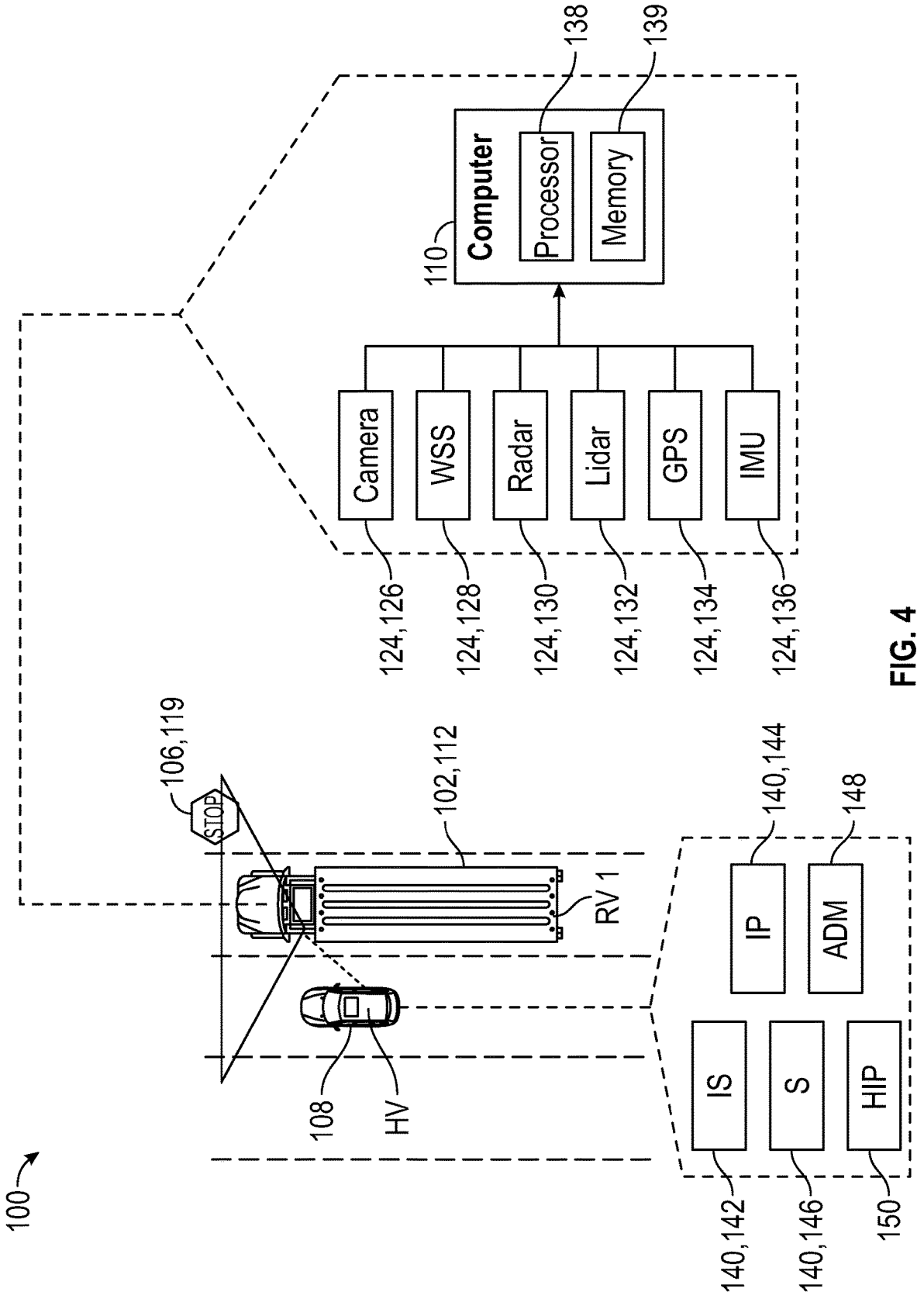
FIG. 4 is a schematic view of the hidden road parameter detection system of FIG. 1, where the local remote vehicle is the obstruction blocking a line of sight from the host vehicle to the roadside sign.

Referring generally to FIGS. 1-3, there is generally shown one non-limiting example of a hidden road parameter detection system 100 (system) including a local remote vehicle 102 that has an unobstructed line of sight to a road parameter 106 and a host vehicle 108, which does not have an unobstructed line of sight to the road parameter and communicates with the local remote vehicle 102 to determine the road parameter 106. The host vehicle 108 and/or the local remote vehicle 102 may be a fully autonomous vehicle, a semi-autonomous vehicle, or a fully manual vehicle. The local remote vehicle 102 includes a computer 110, with an obstruction 112 blocking a line of sight from the host vehicle 108 to a road parameter 106 and the host vehicle 108 communicating with the computer 110 of the local remote vehicle 102 to determine the road parameter 106. In these non-limiting examples, the road parameters 106 include a traffic signal 114 projecting a green light 116 (FIG. 1), the traffic signal 114 projecting a red light 118 (FIG. 2), and a roadside sign 119 indicating a speed limit 120 (FIG. 3). In other non-limiting examples, the road parameter can include a Vulnerable Road User, cross-traffic, other roadside signs (e.g., a stop sign, a merging lane sign, etc.) and the like. The host vehicle 108 and/or the local remote vehicle 102 may be a fully autonomous vehicle, a semi-autonomous vehicle, or a fully manual vehicle. As described in detail below, in some non-limiting examples shown in FIGS. 1, 2, and 4, the obstruction 112 may be the local remote vehicle 102. In another non-limiting example shown in FIG. 3, the obstruction 112 may be a third vehicle 122 separate from the host vehicle 108 and the local remote vehicle 102.

Referring to FIG. 1, the local remote vehicle 102 includes one or more remote input devices 124 generating one or more remote input signals associated with data indicative of: the host vehicle 108 (e.g., a position of the local remote vehicle, a heading of the local remote vehicle, a velocity of the local remote vehicle, a classification of the local remote vehicle, etc.); the road parameter 106 including a type of road parameter (e.g., the traffic signal projecting a green light, the traffic signal projecting a red light, a roadside sign including a notification indicative of a speed limit, merging lane, etc.) and a location of the road parameter (e.g. longitude, latitude), as well as other visual or other information associated with the road parameter; and the obstruction blocking a line of sight between the host vehicle 108 and the road parameter 106 (e.g., the third vehicle 122 having a predetermined classification, position, heading, velocity, and the like for blocking the line of sight etc.). The remote input devices 124 may include a camera 126, a wheel speed sensor 128, a Radio Detection and Ranging device 130, a Light Detection and Ranging device 132, a Global Positioning System 134, and an Inertial Measurement Unit 136. In other non-limiting examples, the remote input devices can include other suitable sensors determining a notification associated with the road parameter and further determining that the obstruction 112 is blocking the line of sight from the host vehicle 108 to the obstruction 112.

The local remote vehicle 102 further includes the computer 110, which has one or more processors 138 communicating with the host vehicle 108 and a non-transitory computer readable medium 139 storing instructions. The processor 138 is programmed to receive the remote input signal from the remote input device 124 (e.g., the camera 126, the wheel speed sensor 128, the Radio Detection and Ranging device 130, the Light Detection and Ranging device 132, the Global Positioning System 134, and the Inertial Measurement Unit 136, etc.). in one example, the processor 138 receives the remote input signal via wireless communication (e.g., 4G, 5G, C-V2X, DSRC, etc.) The processor 138 may be further programmed to determine a classification and/or associated size of the obstruction 112 based on the remote input signal. The processor 138 is further programmed to compare the classification of the obstruction to a plurality of predetermined size classifications (e.g., a tractor trailer, a box truck, a cement mixer truck, a mobile crane truck, a dump truck, a garbage truck, a log carrier, a refrigerator truck, a tank truck, a van, a cutaway van chassis, a medium duty truck, a platform truck, a flatbed truck, a stake bed truck, a firetruck, a recreational vehicle, a motor home, a delivery truck, a minivan, a sport utility vehicle, a pickup truck, a panel truck, a tow truck, and the like), in response to the processor 138 receiving the remote input signal from the remote input device 124.

The processor 138 is further programmed to determine a field of view of the host vehicle 108 based on a position of the host vehicle, a position of the road parameter, and a position of the obstruction in response to the processor receiving the remote input signal. The processor 138 is further programmed to compare the field of view to a line of sight from the host vehicle 108 to the road parameter 106 based on the classification of the obstruction 112. The processor 138 is further programmed to generate an actuation signal, in response to the processor 138 determining that the obstruction 112 is blocking the line of sight from the host vehicle 108 to the road parameter 106. The processor 138 is further programmed to transmit the actuation signal to the host vehicle 108.

The host vehicle 108 includes one or more notification devices 140 (e.g., an infotainment system 142, an instrument panel 144, a speaker 146, etc.) notifying an occupant of the host vehicle 108 of the road parameter 106, in response to the notification device 140 receiving the actuation signal from the processor 138. In this non-limiting example, the host vehicle 108 further includes an autonomous driving module 148 to maneuver the host vehicle 108 (e.g., to maneuver the host vehicle 108 around the obstruction 112, to stop the host vehicle 108, to increase or decrease the real-time speed of the host vehicle 108, to cause the host vehicle 108 to turn or change lines, etc.).

Referring again to FIG. 1, the processor 138 is programmed to determine that the traffic signal is projecting a green light, in response to the processor 138 receiving the remote input signal from the remote input device 124. The processor 138 is further programmed to generate the remote input signal, with the remote input signal being further associated with data indicative of the obstruction being stopped before the green light. The processor 138 is further programmed to generate the actuation signal, with the actuation signal being further associated with an instruction for the host vehicle 108 to actuate an autonomous driving module 148 to maneuver the host vehicle 108 around the obstruction 112. The autonomous driving module 148 of the host vehicle 108 maneuvers the host vehicle 108 around the stopped obstruction 112, in response to the autonomous driving module 148 receiving the actuation signal.

Referring to FIG. 2, the processor 138 is programmed to determine that the traffic signal is projecting a red light, in response to the processor 138 receiving the remote input signal from the remote input device 124. The processor 138 is further programmed to generate the remote input signal, with the remote input signal being further associated with data indicative of the obstruction travelling through the red light. The processor 138 is further programmed to generate the actuation signal, with the actuation signal being associated with an instruction for the host vehicle to actuate the autonomous driving module to stop the host vehicle before the red light. The autonomous driving module 148 of the host vehicle 108 stops the host vehicle before the red light, in response to the autonomous driving module 148 receiving the actuation signal.

Referring to FIG. 3, the processor is further programmed to determine a notification associated with a roadside sign 119, in response to the processor 138 receiving the remote input signal from the remote input device 124. The processor 138 is further programmed to generate the actuation signal, with the actuation signal being further associated with an instruction for the host vehicle to actuate the autonomous driving module 148 to control the host vehicle based on the notification. More specifically, in this non-limiting example, the notification indicates a speed limit, and the host vehicle 108 includes one or more host input devices 150 generating one or more host input signals associated with data indicative of a real-time speed of the host vehicle. The processor 138 generates the actuation signal, with the actuation signal being further associated with an instruction for the host vehicle 108 to actuate the autonomous driving module to decrease the real-time speed of the host vehicle 108 to the speed limit.

Figure 5:
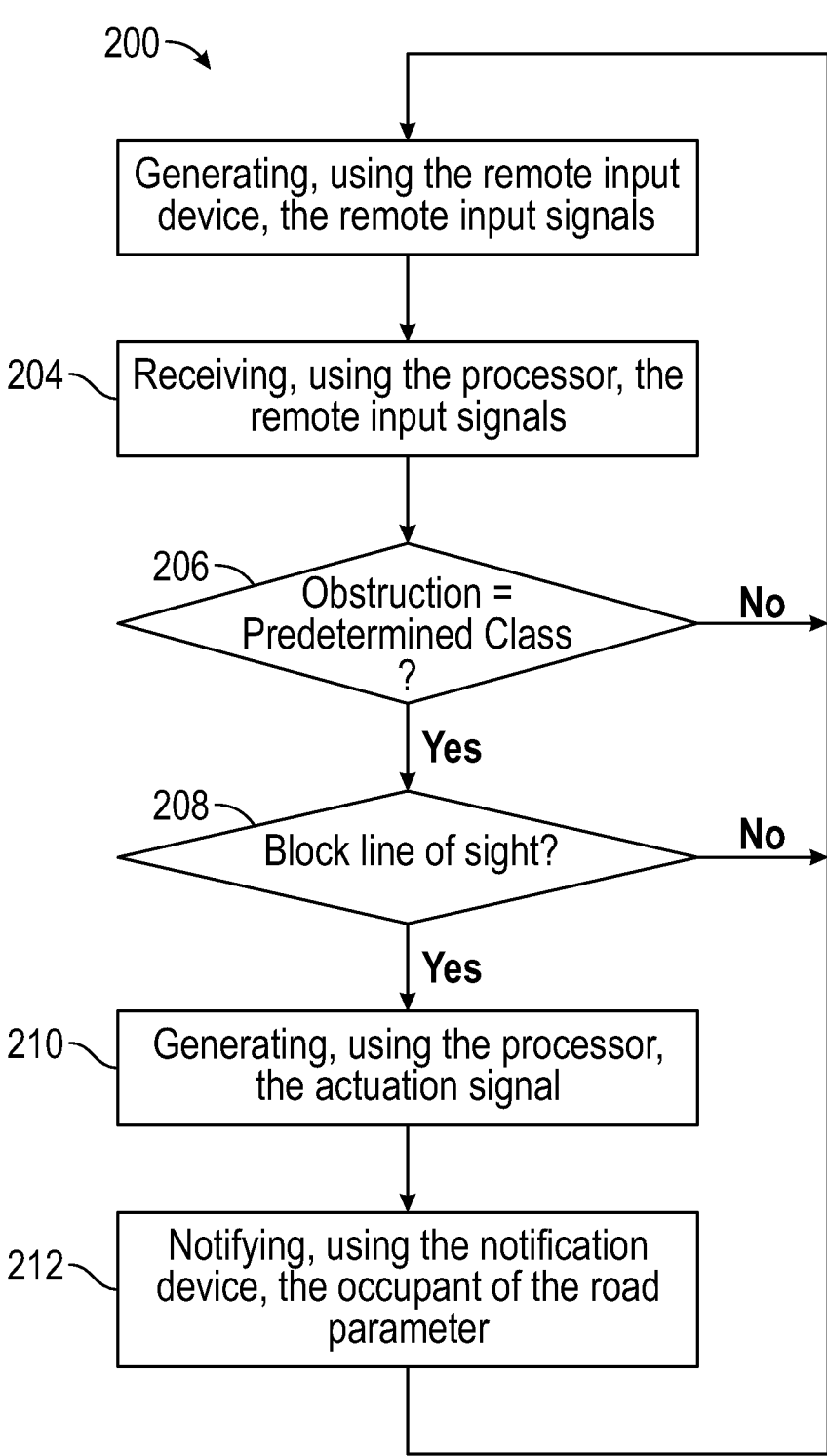
FIG. 5 is a flow chart of one example of a method of operating the computer of the hidden road parameter detection system of FIG. 1.

Referring to FIG. 5, one non-limiting example of a method 200 is provided for operating the computer 110 of the hidden road parameter detection system 100 of FIG. 1. The method 200 begins at block 202 with generating, using the remote input devices of the local remote vehicle 102, one or more remote input signals associated with data indicative of the host vehicle 108, the road parameter 106, and the obstruction 112 blocking the line of sight between the host vehicle 108 and the road parameter 106. The method 200 then proceeds to block 204.

At block 204, the method 200 further includes receiving, using the processor 138 of the computer 110 of the local remote vehicle 102, the remote input signals (e.g., the camera 126, the wheel speed sensor 128, the Radio Detection and Ranging device 130, the Light Detection and Ranging device 132, the Global Positioning System 134, and the Inertial Measurement Unit 136, etc.) from the remote input devices 124, with the computer 110 further including a non-transitory computer readable medium 139 storing instructions. In one non-limiting example, the method 200 includes determining, using the processor 138, that the traffic signal is projecting a green light (FIG. 1), in response to the processor 138 receiving the remote input signal associated with data indicative of the green light. In another non-limiting example, the method 200 includes determining, using the processor 138, that the traffic signal is projecting the red light in response to the processor 138 receiving the remote input signal associated with data indicative of the red light. In still another non-limiting example, the method 200 includes determining, using the processor 138, the notification associated with the roadside sign 119 in response to the processor 138 receiving the remote input signal from the remote input device 124. In particular, the method may include determining, using the processor 138, a speed limit associated with the notification of the roadside sign 119. The method 200 then proceeds to block 206.

At block 206, the method 200 further includes comparing, using the processor 138, the classification of the obstruction 112 to the plurality of predetermined size classifications stored in the non-transitory computer readable storage medium 139, in response to the processor 138 receiving the remote input signal from the remote input devices 124. If the processor 138 determines that the classification of the obstruction is not one of the predetermined size classifications, the method 200 returns to block 202. If the processor 138 determines that the classification of the obstruction is one of the predetermined size classifications, the method 200 proceeds to block 208.

At block 208, the method 200 further includes comparing, using the processor 138, the field of view to a line of sight from the host vehicle 108 to the road parameter 106. More specifically, the method 200 includes determining, using the processor 138, a field of view of the host vehicle 108 based on a position of the host vehicle 108, a position of the road parameter 106, and a position of the obstruction 112 in response to the processor 138 determining that the classification of the obstruction is one of the predetermined size classifications. If the processor 138 does not determine that the obstruction 112 blocks the line of sight from the host vehicle 108 to the road parameter 106, the method 200 returns to block 202. If the processor 138 determines that the obstruction 112 blocks the line of sight from the host vehicle 108 to the road parameter 106, the method 200 proceeds to block 210.

At block 210, the method 200 further includes generating, using the processor 138, the actuation signal in response to the processor 138 determining that the obstruction 112 is blocking the line of sight from the host vehicle 108 to the road parameter 106. More specifically, in one non-limiting example (FIG. 1), the method 200 may include generating, using one or more of the remote input devices 124, one or more remote input signals associated with data indicative of the obstruction 112 being stopped before the green light. In another non-limiting example (FIG. 2), the method 200 may include generating, using one or more of the remote input devices 124, one or more remote input signals associated with data indicative of the obstruction 112 travelling through the red light. In yet another non-limiting example (FIG. 3), the method 200 may further include generating, using one or more of the remote input devices 124, one or more remote input signals associated with data indicative of the obstruction 112 blocking the roadside sign providing the notification, such as the speed limit (FIG. 4), a merging lane warning (FIG. 5), and the like. In still non-limiting example, the method 200 may include generating, using the host input device 150, the host input signal associated with data indicative of a parameter of the host vehicle (e.g., a real-time speed of the host vehicle 108, a heading of the host vehicle 108, a velocity of the host vehicle 108, etc.). The method 200 may further include generating, using the processor 138, the actuation signal in response to the processor further receiving the remote input signal from the remote input devices 124 and the host input signal from the host vehicle 108. The method 200 further includes transmitting, using the processor 138, the actuation signal to the host vehicle 108. The method 200 then proceeds to block 212.

At block 212, the method 200 further includes notifying, using the notification device 140 of the host vehicle, an occupant of the host vehicle 108 of the road parameter, in response to the notification device 140 receiving the actuation signal from the processor 138. In one non-limiting example (FIG. 1), the autonomous driving module 148 of the host vehicle 108 maneuvers the host vehicle 108 around the stopped obstruction when the processor 138 determines that the obstruction stopped before the green light, based on the remote input signal and the host input signal. In another non-limiting example (FIG. 2), the autonomous driving module 148 of the host vehicle 108 stops the host vehicle 108 before the red light when the processor 138 determines that the obstruction 112 is travelling through the red light, based on the remote input signal and the host input signal. In yet another non-limiting example (FIG. 3), the autonomous driving module 148 of the host vehicle 108 controls the host vehicle 108 based on the notification (e.g., decreases the real-time speed of the host vehicle 108 to the speed limit when the processor 138 determines that the obstruction 112 is travelling above the speed limit, based on the remote input signal and the host input signal).

The flow chart provided in the present disclosure illustrate operations implemented by the system according to some exemplary embodiments of the present disclosure. It should be understood that the operations shown in the flow charts may be performed in a different order. The operations may be performed in a different order or performed simultaneously. In addition, one or more other operations can be added to the flow charts, and one or more operations can be removed from the flow charts.

In the present disclosure, the term "autonomous vehicle" may refer to a vehicle that has the ability to perceive its environment, and automatically perceive, judge and make decisions based on the external environment without human (e.g., a driver, a pilot, etc.) input and/or intervention. The terms "autonomous driving vehicle" and "vehicle" can be used interchangeably herein.

Moreover, although the system and method provided in the present disclosure mainly describe the hidden road parameter detection system and method that can be used for autonomous driving, it should be understood that these are only some exemplary embodiments. The system and method of the present disclosure can be applied to any other types of transportation systems. For example, the system and method of the present disclosure may be applied to various transportation systems in different environments, including land, sea, aerospace, etc., or any combination thereof. The autonomous driving vehicles of a transportation system may include, but are not limited to, taxis, private cars, trailers, buses, trains, bullet trains, high-speed railways, subways, ships, airplanes, spacecraft, etc., or any combination thereof. In some exemplary embodiments, the system and method of the present disclosure can find applications in logistics warehouses and military affairs, for example.

In general, the computing systems and/or devices described may employ any of a number of computer operating systems, including, but by no means limited to, versions and/or varieties of the ANDROID AUTOMOTIVE OS developed by GOOGLE INC., the MICROSOFT WINDOWS operating system, the UNIX operating system (e.g., the SOLARIS operating system distributed by ORACLE Corporation of Redwood Shores, California), the AIX UNIX operating system distributed by INTERNATIONAL BUSINESS MACHINES of Armonk, New York, the LINUX operating system, the MAC OSX and iOS operating systems distributed by APPLE INC. of Cupertino, California, the BLACKBERRY OS distributed by BLACKBERRY LTD. of Waterloo, Canada, and the OPEN HANDSET ALLIANCE, or the QNX CAR Platform for Infotainment offered by QNX Software Systems. Examples of computing devices include, without limitation, an on board vehicle computer, a computer workstation, a server, a desktop, notebook, laptop, or handheld computer, or some other computing system and/or device.

Computers and computing devices generally include computer executable instructions, where the instructions may be executable by one or more computing devices such as those listed above. Computer executable instructions may be compiled or interpreted from computer programs created using a variety of programming languages and/or technologies. Some of these applications may be compiled and executed on a virtual machine. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

The non-transitory computer readable medium that participates in providing data (e.g., instructions) may be read by the computer (e.g., by a processor of a computer and may take many forms, including, but not limited to, non-volatile media and volatile media. Non-volatile media may include, for example, optical or magnetic disks and other persistent memory. Volatile media may include, for example, dynamic random-access memory, which typically constitutes a main memory. Such instructions may be transmitted by one or more transmission media, including coaxial cables, copper wire and fiber optics, including the wires that comprise a system bus coupled to a processor of an Engine Control Unit.

Databases, data repositories or other data stores described herein may include various kinds of mechanisms for storing, accessing, and retrieving various kinds of data, including a hierarchical database, a set of files in a file system, an application database in a proprietary format, a relational database management system, etc. Each such data store is generally included within a computing device employing a computer operating system, such as one of those mentioned above, and are accessed via a network in any one or more of a variety of manners. A file system may be accessible from a computer operating system and may include files stored in various formats.

In some examples, system elements may be implemented as computer readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A hidden road parameter detection system with a host vehicle, the hidden road parameter detection system comprising:

a remote vehicle including:

12 at least one remote input device generating at least one remote input signal associated with data indicative of at least one of the host vehicle, a road parameter, and an obstruction having an associated size blocking a line of sight between the host vehicle and the road parameter;

a computer including:

at least one processor communicating with the host vehicle; and a non-transitory computer readable medium storing instructions such that the at least one processor is programmed to:

receive the at least one remote input signal from the at least one remote input device wherein the input signal includes information about the road parameter including: a type of road parameter and a location of the road parameter, and wherein the input signal is communicated to the host vehicle via wireless communication;

compare a classification of the obstruction to a plurality of predetermined size classifications in response to the at least one processor receiving the at least one remote input signal from the at least one remote input device;

determine a field of view of the host vehicle based on a position of the host vehicle, a position of the road parameter, and a position of the obstruction based on comparing the associated size of the obstruction to one of the plurality of predetermined size classifications in response to the at least one processor receiving the at least one remote input signal;

compare the field of view to a line of sight from the host vehicle to the road parameter;

generate an actuation signal associated with an instruction for the host vehicle to actuate an autonomous driving module of the host vehicle to maneuver the host vehicle around the obstruction in response to the at least one processor determining that the obstruction is blocking the line of sight from the host vehicle to the road parameter; and transmit the actuation signal to the host vehicle wherein the autonomous driving module of the host vehicle maneuvers the host vehicle around the stopped obstruction; and wherein the host vehicle includes at least one notification device notifying an occupant of the host vehicle of the road parameter in response to the notification device receiving the actuation signal from the at least one processor.

2. The hidden road parameter detection system of claim 1 wherein the obstruction comprises one of:

a local remote vehicle positioned between the host vehicle and the road parameter; and a third vehicle separate from the host vehicle and the local remote vehicle.

3. The hidden road parameter detection system of claim 2 wherein the at least one processor is further programmed to:

determine that the road parameter is a traffic signal;

determine that a traffic signal is projecting a green light in response to the at least one processor receiving the at least one remote input signal from the at least one remote input device; and generate the at least one remote input signal further associated with data indicative of the obstruction being stopped before the green light.

4. The hidden road parameter detection system of claim 3 wherein the at least one processor is further programmed to determine that the traffic signal is projecting a red light in response to the at least one processor receiving the at least one remote input signal from the at least one remote input device.

5. The hidden road parameter detection system of claim 4 wherein the at least one processor is further programmed to:
generate the at least one remote input signal further associated with data indicative of the obstruction travelling through the red light; and
generate the actuation signal associated with an instruction for the host vehicle to actuate the autonomous driving module to stop the host vehicle before the red light;
wherein the autonomous driving module of the host vehicle stops the host vehicle before the red light.

6. The hidden road parameter detection system of claim 2 wherein the at least one processor is further programmed to determine a notification associated with a roadside sign in response to the at least one processor receiving the at least one remote input signal from the at least one remote input device.

7. The hidden road parameter detection system of claim 6 wherein the at least one processor is further programmed to generate the actuation signal associated with an instruction for the host vehicle to actuate the autonomous driving module to control the host vehicle based on the notification.

8. The hidden road parameter detection system of claim 7 wherein the notification indicates a speed limit, and the host vehicle includes at least one host input device generating at least one host input signal associated with data indicative of a real-time speed of the host vehicle, and the actuation signal is associated with an instruction for the host vehicle to actuate the autonomous driving module to decrease the real-time speed of the host vehicle to the speed limit.

9. The hidden road parameter detection system of claim 8 wherein the at least one remote input device comprises at least one of a camera, a wheel speed sensor, a Radio Detection and Ranging device, a Light Detection and Ranging device, a Global Positioning System, and an Inertial Measurement Unit.

10. A computer for a hidden road parameter detection system with a host vehicle and a remote vehicle, with the computer comprising:
at least one processor communicating with the host vehicle; and
a non-transitory computer readable medium storing instructions such that the at least one processor is programmed to:
receive at least one remote input signal from at least one remote input device of a local remote vehicle wherein the input signal is communicated to the host vehicle via wireless communication, with the at least one remote input signal being associated with data indicative of at least one of the host vehicle, the road parameter, and an obstruction having an associated size blocking a line of sight between the host vehicle and the road parameter;
compare a classification of the obstruction to a plurality of predetermined size classifications in response to the at least one processor receiving the at least one remote input signal from the at least one remote input device;
determine a field of view of the host vehicle based on a position of the host vehicle, a position of the road parameter, and a position of the obstruction based on comparing the associated size of the obstruction to one of the plurality of predetermined size classifications in response to the at least one processor receiving the at least one remote input signal;
compare the field of view to a line of sight from the host vehicle to the road parameter;
generate an actuation signal associated with an instruction for the host vehicle to actuate an autonomous driving module of the host vehicle to maneuver the host vehicle around the obstruction in response to the at least one processor determining that the obstruction is blocking the line of sight from the host vehicle to the road parameter;
transmit the actuation signal to the host vehicle; and
actuate the autonomous driving module of the host vehicle to maneuver the host vehicle around the obstruction in response to the autonomous driving module receiving the actuation signal from the at least one processor; and
wherein the host vehicle includes at least one notification device notifying an occupant of the host vehicle of the road parameter in response to the notification device receiving the actuation signal from the at least one processor.

11. The computer of claim 10 wherein the road parameter is a traffic signal projecting a green light associated with the host vehicle, and the at least one processor is further programmed to:
determine that the road parameter is a traffic signal;
determine that the traffic signal is projecting a green light in response to the at least one processor receiving the at least one remote input signal from the at least one remote input device; and
generate the at least one remote input signal associated with data further indicative of the obstruction being stopped before the green light.

12. The computer of claim 11 wherein the road parameter is the traffic signal projecting a red light associated with the host vehicle, and the at least one processor is further programmed to:
determine that the traffic signal is projecting the red light in response to the at least one processor receiving the at least one remote input signal from the at least one remote input device;
generate the remote input signal associated with data further indicative of one of the obstruction travelling through the red light;
generate the actuation signal further associated with an instruction for the host vehicle to actuate the autonomous driving module to stop the host vehicle before the red light; and
actuate the autonomous driving module to cause the host vehicle to stop before the red light in response to the autonomous driving module receiving the actuation signal from the at least one processor.

13. The computer of claim 12 wherein the road parameter is a roadside sign positioned adjacent to a road where the host vehicle is located, and the at least one processor is further programmed to:
determine a notification associated with the roadside sign in response to the at least one processor receiving the at least one remote input signal from the at least one remote input device; and
actuate the autonomous driving module to operate the host vehicle based on the notification in response to the host vehicle receiving the actuation signal.

14. The computer of claim 13 wherein the notification indicates a speed limit, and the at least one processor is further programmed to:

generate the at least one remote input signal associated with data further indicative of a real-time speed of the host vehicle;

generate the actuation signal further associated with an instruction for the host vehicle to actuate the autonomous driving module to decrease the real-time speed to the speed limit; and wherein the autonomous driving module decreases the real-time speed of the host vehicle to the speed limit in response to the host vehicle receiving the actuation signal from the at least one processor.

15. A method for operating a computer for a hidden road parameter detection system, the method comprising:

generating, using at least one remote input device of a remote vehicle, at least one remote input signal associated with data indicative of at least one of a host vehicle, a road parameter, and an obstruction having an associated size blocking a line of sight between the host vehicle and the road parameter;

receiving, using at least one processor of a computer of a local remote vehicle, the at least one remote input signal from the at least one remote input device, with the computer further including a non-transitory computer readable medium storing instructions;

comparing, using at least one processor, a classification of the obstruction to a plurality of predetermined size classifications in response to the at least one processor receiving the at least one remote input signal from the at least one remote input device;

determining, using the at least one processor, a field of view of the host vehicle based on a position of the host vehicle, a position of the road parameter, and a position of the obstruction based on comparing the associated size of the obstruction to one of the plurality of predetermined size classifications in response to the at least one processor receiving the at least one remote input signal;

comparing, using the at least one processor, the field of view to a line of sight from the host vehicle to the road parameter;

generating, using the at least one processor, an actuation signal associated with an instruction for the host vehicle to actuate an autonomous driving module of the host vehicle to maneuver the host vehicle around the obstruction in response to the at least one processor determining that the obstruction is blocking the line of sight from the host vehicle to the road parameter; and transmitting, using the at least one processor, the actuation signal to the host vehicle wherein an autonomous driving module of the host vehicle maneuvers the host vehicle around the obstruction; and wherein the host vehicle includes at least one notification device notifying an occupant of the host vehicle of the road parameter in response to the notification device receiving the actuation signal from the at least one processor.

16. The method of claim 15 further comprising:

determining, using the at least one processor, that the traffic signal is projecting a green light in response to the at least one processor receiving the remote input signal associated with data indicative of the green light;

generating, using at least one remote input device of the host vehicle, at least one remote input signal associated with data indicative of the obstruction being stopped before the green light; and generating, using the at least one processor, the actuation signal in response to the at least one processor further receiving at least one host input signal; and wherein an autonomous driving module of the host vehicle maneuvers the host vehicle around the stopped obstruction.

17. The method of claim 15 further comprising:

determining, using the at least one processor, that the traffic signal is projecting a red light in response to the at least one processor receiving the at least one remote input signal from the at least one remote input device;

generating, using the at least one remote input device, the at least one remote input signal associated with data indicative of the obstruction travelling through the red light; and generating, using the at least one processor, the actuation signal in response to the at least one processor further receiving at least one host input signal; and wherein an autonomous driving module of the host vehicle stops the host vehicle before the red light.

18. The method of claim 15 further comprising:

determining, using the at least one processor, a notification associated with a roadside sign in response to the at least one processor receiving the at least one remote input signal from the at least one remote input device;

generating, using at least one host input device, at least one host input signal associated with data indicative of a host vehicle parameter associated with the host vehicle; and generating, using the at least one processor, the actuation signal in response to the at least one processor further receiving the at least one host input signal; and wherein an autonomous driving module of the host vehicle controls the host vehicle based on the notification.

19. The method of claim 18 further comprising:

determining, using the at least one processor, a speed limit associated with the notification of the roadside sign; and generating, using at least one host input device, at least one host input signal associated with data indicative of a real-time speed of the host vehicle; and wherein the autonomous driving module of the host vehicle decreases the real-time speed of the host vehicle to the speed limit.

\*   \*   \*   \*   \*